United States Patent
Chen

(10) Patent No.: US 9,965,989 B2
(45) Date of Patent: May 8, 2018

(54) METHOD AND APPARATUS FOR CONTROLLING LOW GRAYSCALE WHITE BALANCE

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 83 days.

(21) Appl. No.: 14/913,688

(22) PCT Filed: Dec. 17, 2015

(86) PCT No.: PCT/CN2015/097723
§ 371 (c)(1),
(2) Date: Feb. 23, 2016

(87) PCT Pub. No.: WO2017/080015
PCT Pub. Date: May 18, 2017

(65) Prior Publication Data
US 2017/0263172 A1    Sep. 14, 2017

(30) Foreign Application Priority Data

Nov. 11, 2015    (CN) .......................... 2015 1 0765934

(51) Int. Cl.
G09G 3/20    (2006.01)
G09G 3/36    (2006.01)

(52) U.S. Cl.
CPC .......... *G09G 3/2003* (2013.01); *G09G 3/2007* (2013.01); *G09G 3/36* (2013.01); *G09G 2320/0666* (2013.01)

(58) Field of Classification Search
CPC ...... G09G 3/2003; G09G 3/36; G09G 3/2007; G09G 2320/0666
See application file for complete search history.

(56) References Cited

U.S. PATENT DOCUMENTS

2005/0213128 A1*  9/2005  Imai ..................... H04N 1/6077
                                                              358/1.9
2006/0023233 A1*  2/2006  Madden ............... H04N 1/6077
                                                              358/1.9

(Continued)

FOREIGN PATENT DOCUMENTS

CN             101923837 A    12/2010

*Primary Examiner* — Ariel Balaoing
(74) *Attorney, Agent, or Firm* — Andrew C. Cheng

(57) ABSTRACT

Disclosed are a method and device for controlling low grayscale white balance. The method comprises: calculating a total color difference $\Delta E(n_{max}-0)$ between a grayscale 0 and a grayscale threshold value $n_{max}$, according to measured tristimulus values of the grayscale 0 and the grayscale threshold value $n_{max}$; determining a color difference relation between various grayscales from the grayscale 0 to the grayscale threshold value $n_{max}$, according to the total color difference $\Delta E(n_{max}-0)$ between the grayscale 0 and the grayscale threshold value $n_{max}$, wherein the color difference relation enables human eyes to observe a gradual and smooth change from the grayscale 0 to the grayscale threshold value $n_{max}$; and controlling white balance according to the color difference relation between various grayscales from the grayscale 0 to the grayscale threshold value $n_{max}$. By means of the method, the present invention can automatically adjust white balance, and the transition between low grayscales can be smooth and natural when observed by human eyes.

16 Claims, 3 Drawing Sheets

(56) References Cited

U.S. PATENT DOCUMENTS

| | | |
|---|---|---|
| 2008/0117334 A1 | 5/2008 | Chao et al. |
| 2009/0185226 A1* | 7/2009 | Kobayashi ............ G03G 21/043 358/1.18 |
| 2009/0309994 A1 | 12/2009 | Inoue |
| 2010/0259551 A1 | 10/2010 | Kao |
| 2011/0227941 A1* | 9/2011 | Huang ................. H04N 1/6027 345/596 |
| 2011/0234644 A1* | 9/2011 | Park ..................... G09G 3/2003 345/690 |
| 2013/0155091 A1* | 6/2013 | Dai ...................... G09G 3/3648 345/589 |
| 2013/0155120 A1* | 6/2013 | Kang ........................ G09G 5/02 345/690 |
| 2013/0201224 A1 | 8/2013 | Kang |
| 2016/0189347 A1* | 6/2016 | Hu ............................ G06T 5/00 345/589 |
| 2016/0240123 A1* | 8/2016 | Wu ........................ G01M 11/02 |

* cited by examiner

METHOD AND APPARATUS FOR CONTROLLING LOW GRAYSCALE WHITE BALANCE

FIELD OF THE DISCLOSURE

The present disclosure relates to an image display technology field, and more particularly to a method and an apparatus for controlling low grayscale white balance.

BACKGROUND OF THE DISCLOSURE

Since the factors driving the characteristics of the LCD panel, the white balance gray color performance differences have a considerable degree of color shift. In order to display a certain color correctness and consistency, therefore, it must be carried out one by one to monitor gray white balance (Grayscale white balance) adjustment.

Gray white balance adjustment method of the prior art is to make the display pixel displays white images in all gray, and then adjust the red, green and blue image intensity gain value (Gain), so that a white image is displayed chrominance and luminance values close to the color value and the brightness value of a target value of white, the white image is adjusted within a certain color temperature (Color temperature) and color deviation (Color derivation) range. Wherein, testing low grayscale is difficult. For the low grayscale, the present method of white balance for no better treatment methods, it is often to manual testing the white balance by a R/G/B lookup table designed by eyes subjectivity in feeling after a higher grayscale is calculated. There is also an algorithm to automatic adjustment low grayscale white balance.

However, the manual testing method increases workload of development and design staff and has a large error by different subjective feelings between people. The formula of the automatic method is tedious, complex and large computation. However, the low grayscale is transition unsmoothness when the white balance is calculated and eyes are observing subjectivity.

SUMMARY OF THE DISCLOSURE

The technical problem of the disclosure is to provide a method and an apparatus for controlling low grayscale white balance can controlling the white balance automatically and the low grayscale transitions smoother and natural when eyes is observing subjectivity.

In order to solve the above problems, the technical aspect of the present disclosure are: providing a method for controlling low grayscale white balance, a low grayscale is less than or equal to a grayscale threshold $n_{max}$ value, the method including: measuring a tristimulus value of a grayscale zero and a tristimulus value of the grayscale threshold value $n_{max}$ to calculate a total color difference value $^{\Delta}E(n_{max}-0)$ between the grayscale zero and the grayscale threshold value $n_{max}$; determining a color difference relationship among grayscale from the grayscale zero to the grayscale threshold value according to the total color difference value $^{\Delta}E(n_{max}-0)$ between the grayscale zero and the grayscale threshold $n_{max}$, and the color difference relationship makes eyes observe that variation from the grayscale zero to the grayscale threshold $n_{max}$ is smooth; controlling white balance according to the color difference relationship between the grayscale zero to the grayscale threshold $n_{max}$; wherein, the color difference relationship is $^{\Delta}E$, the $^{\Delta}E$ is $^{\Delta}E(n_{max}-0)/(n_{max}-0)$; or the color difference relationship is $\Delta E(m)$, the $^{\Delta}E(m)$ is $f(\Delta E(n_{max}-0)/(n_{max}-0))$, wherein, the f is a monotonically increasing function which makes the $\Delta E(m)$ increased with the grayscale m, the $^{\Delta}E(m)$ is a color difference between the grayscale m and the grayscale m−1.

Wherein the step of measuring a tristimulus value of a grayscale zero and a tristimulus value of the grayscale threshold value $n_{max}$ to calculate a total color difference value $^{\Delta}E(n_{max}-0)$ between the grayscale zero and the grayscale threshold value $n_{max}$; including the following steps: respectively measuring the tristimulus value of the grayscale zero and the tristimulus value of the grayscale threshold value $n_{max}$; using the tristimulus value of the grayscale zero and the tristimulus value of the grayscale threshold $n_{max}$ to calculate a total color difference value $^{\Delta}E(n_{max}-0)$ between the grayscale zero and the grayscale threshold $n_{max}$ value.

Wherein the step of using the tristimulus value of the grayscale zero and the tristimulus value of the grayscale threshold $n_{max}$ value to calculate the total color difference value $^{\Delta}E(n_{max}-0)$ between the grayscale zero and the grayscale threshold $n_{max}$, including the following steps: using the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value; using the L, a, b values of the grayscale zero and the grayscale threshold $n_{max}$ to calculate the total color difference value $^{\Delta}E(n_{max}-0)$ between the grayscale zero and the grayscale threshold $n_{max}$ value.

Wherein the grayscale threshold $n_{max}$ value is 30.

In order to solve the above problems, the another technical aspect of the present disclosure are: providing a method for controlling low grayscale white balance, the low grayscale is less than or equal to a grayscale threshold $n_{max}$ value, the method including: measuring a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$; determining a color difference relationship among grayscale from the grayscale zero to the grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth; controlling white balance according to the color difference relationship between the grayscale zero to the grayscale threshold $n_{max}$.

Wherein the color difference relationship is $\Delta E$, the $\Delta E$ is $\Delta E(n_{max}-0)/(n_{max}-0)$.

Wherein the color difference relationship is $\Delta E(m)$, the $\Delta E(m)$ is $f(\Delta E(n_{max}-0/(n_{max}-0))$, wherein, the f is a monotonically increasing function which makes the $\Delta E(m)$ increased by the grayscale m, the $\Delta E(m)$ is a color difference relationship between the grayscale m and the grayscale m−1.

Wherein the step of measuring a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$; including the following steps: respectively measuring the tristimulus value of the grayscale zero and the tristimulus value of the grayscale threshold value $n_{max}$; using the tristimulus value of the grayscale zero and the tristimulus value of the grayscale threshold $n_{max}$ to calculate a total color difference value $\Delta E(n_{max}-0)$ between the grayscale zero and the grayscale threshold $n_{max}$ value.

Wherein the step of using the tristimulus value of the grayscale zero and the tristimulus value of the grayscale threshold $n_{max}$ value to calculate the total color difference value $\Delta E(n_{max}-0)$ between the grayscale zero and the grayscale threshold $n_{max}$, including the following steps: using the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value; using the L, a, b values of the grayscale zero and the grayscale threshold $n_{max}$ to calculate the total color difference value $\Delta E(n_{max}-0)$ between the grayscale zero and the grayscale threshold $n_{max}$ value.

Wherein the grayscale threshold $n_{max}$ value is 30.

In order to solve the above problems, the another technical aspect of the present disclosure are: providing an apparatus for controlling of low grayscale white balance, wherein the low grayscale is less than or equal to a grayscale threshold value $n_{max}$, the apparatus including: a computing module, calculating a total color difference value $\Delta E(n_{max}-0)$ between a grayscale zero and a grayscale threshold value $n_{max}$ by measuring a tristimulus value of the grayscale zero and a tristimulus value of the grayscale threshold $n_{max}$ value; a determining module, determining a color difference relationship among grayscale from the grayscale zero to the grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth; a control module, controlling white balance according to the color difference relationship between the grayscale zero to the grayscale threshold $n_{max}$ value.

Wherein the color difference relationship is $\Delta E$, the $\Delta E$ is $\Delta E(n_{max}-0)/(n_{max}-0)$.

Wherein the color relationship is $\Delta E(m)$, the $\Delta E(m)$ is $f(\Delta E(n_{max}-0)/(n_{max}-0))$, wherein, the f is a monotonically increasing function which makes the $\Delta E(m)$ increased with the grayscale m, the $\Delta E(m)$ is a color difference relationship between the grayscale m and the grayscale m−1.

Wherein the computing module including: a measuring unit, respectively measuring the tristimulus value of the grayscale zero and the tristimulus value of the grayscale threshold value $n_{max}$; a computing unit using the tristimulus value of the grayscale zero and the tristimulus value of the grayscale threshold $n_{max}$ to calculate a total color difference value $\Delta E(n_{max}-0)$ between the grayscale zero and the grayscale threshold $n_{max}$ value.

Wherein the computing unit including: an obtaining sub-unit, using the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value; a computing sub-unit, using the L, a, b values of the grayscale zero and the grayscale threshold $n_{max}$ to calculate the total color difference value $\Delta E(n_{max}-0)$ between the grayscale zero and the grayscale threshold $n_{max}$ value.

Wherein the grayscale threshold $n_{max}$ value is 30.

The present disclosure has the following advantages: the situation is different from the prior art, the present disclosure is measuring a tristimulus value of a grayscale zero and a tristimulus value of a grayscale threshold value $n_{max}$ to calculate a total color difference value $\Delta E(n_{max}-0)$ between the grayscale zero and the grayscale threshold value $n_{max}$; determining a color difference relationship among grayscale from the grayscale zero to the grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth; controlling white balance according to the color difference relationship between the grayscale zero to the grayscale threshold $n_{max}$. The color difference relationship between the grayscale makes eyes observe that variation from the grayscale zero to the grayscale threshold $n_{max}$ is smooth, and controlling white balance according to the color difference relationship. Through the method, white balance can be controlled automatically and the low grayscale transitions smoother and natural when eyes is observing subjectivity.

DETAILED DESCRIPTION OF PREFERRED EMBODIMENTS

Figure 1:
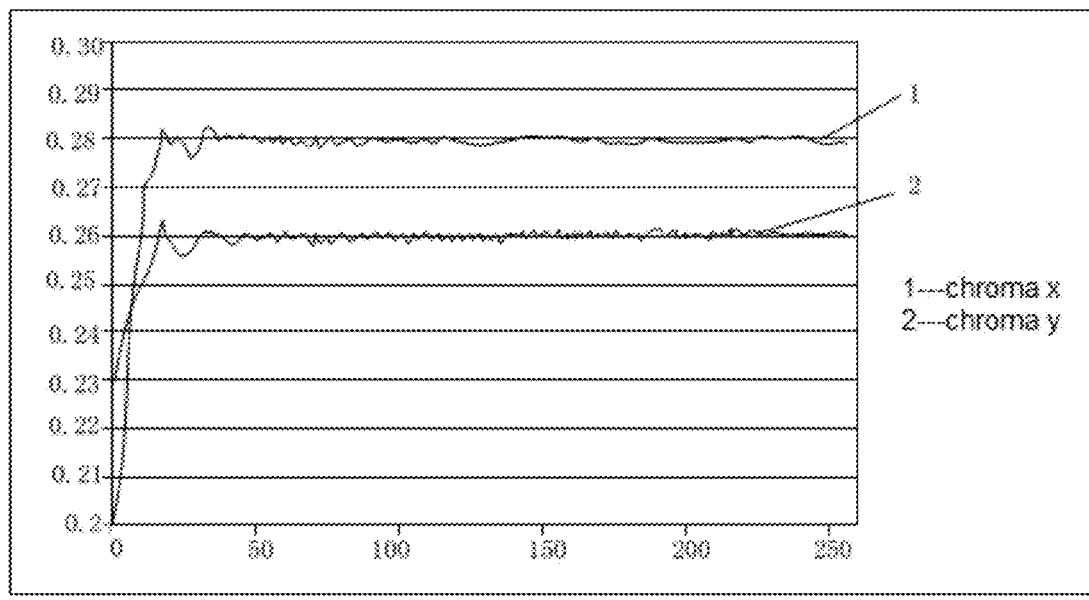
FIG. 1 is a graphical representation of chroma according to the prior art after testing.

Before describing the present disclosure, first introduced at the technical content related to the disclosure.

The current display area of image processing technology is divided into a number of pixels (Pixel) on the LCD panel, and on each of the pixels having red, green and blue sub-pixel RGB. All visible colors can be produced by mixing red, green, and blue light, so that color of the pixel can be performed by controlling these red, green and blue sub-pixel shading.

In order to more appropriately describe the color, CIE (International Commission on Illumination, abbreviated CIE) CIE 1931 XYZ proposed color space (CIE XYZ Color Space). A color space is an objective method to describe color perception for human eye, and a tristimulus value is usually required. More precisely, first the three primary colors are defined, and then a color overlay model is used to represent various colors. It should be noted that the three primary colors are not necessarily true colors (which is the colors cannot be generated). The tristimulus values associated with a color space can be conceptualized as amounts of three primary colors in a tri-chromatic additive color model. The resulting tristimulus values are defined by the CIE 1931 color space, in which they are denoted X, Y, and Z.

In CIE XYZ color space, the tristimulus value, which is not reacted from the human eye to the short, middle and long wavelengths, is a group called X, Y and Z values, approximately similar to red, green and blue (but pay attention to the X, Y and Z values, which does not really appear to be red, green and blue, is parameters derived by red, green and blue), and calculated by color matching functions according to the CIE 1931 XYZ.

Since human eye has three types of color sensors that respond to different ranges of wavelengths, a full plot of all visible colors is a three-dimensional figure. However, the concept of color can be divided into two parts: brightness and chromaticity. For example, the color white is a bright color, while the color gray is considered to be a less bright version of that same white. In other words, the chromaticity of white and gray are the same while their brightness differs.

The CIE XYZ color space was deliberately designed so that the Y parameter was a measure of the brightness or luminance of a color. The chromaticity of a color was then specified by the two derived parameters x and y, two of the three normalized values are functions of all three tristimulus values X, Y, and Z:

$$x = \frac{X}{X+Y+Z}$$
$$y = \frac{Y}{X+Y+Z}$$
$$z = \frac{Z}{X+Y+Z} = 1 - x - y$$

The derived color space specified by x, y, and Y is known as the CIE xyY color space and is widely used to specify colors in practice.

The X and Z tristimulus values can be calculated back from the chromaticity values x and y and the Y tristimulus value:

$$X = \frac{Y}{y}x$$
$$Z = \frac{Y}{y}(1 - x - y)$$

White balance (WB) is a process to prevent abnormal color. In different color temperatures color of an object will change. Wherein, the white object was the most obvious change. In order to minimize the impact of the target color affected by the external light due to color temperature of different subject targets, the original color can be restored. The color correction is performed in order to achieve the correct color balance.

Since the low grayscale display characteristics of liquid crystal display panel and errors from measuring and computing, automatically calculating white balance in low grayscale is often difficult. And a very important reason is brightness characteristic of low grayscale which is difficult to satisfy the requirement of gamma=2.2.

Figure 2:
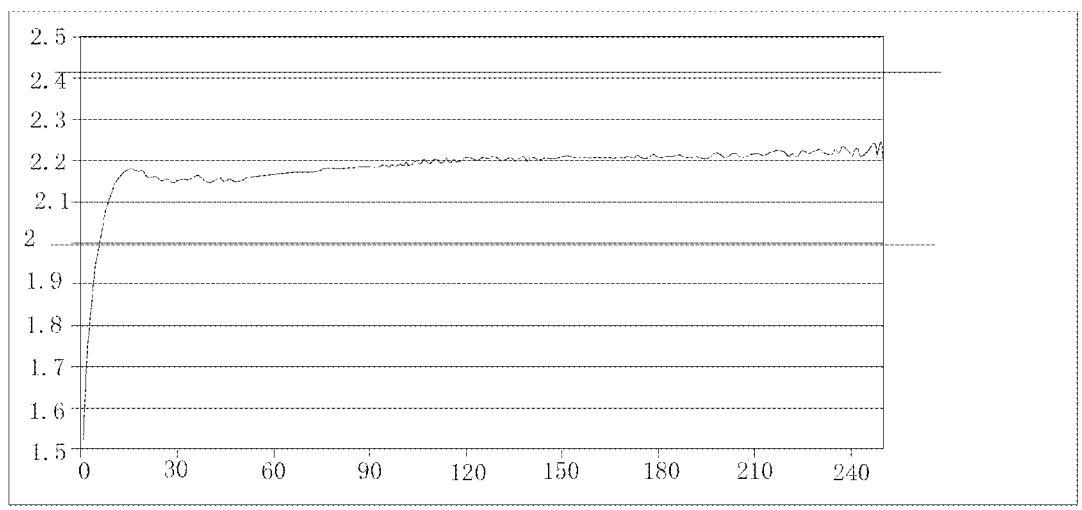
FIG. 2 is a graphical representation of brightness according to the prior art after testing.

A commissioning graphical representation of chroma and a commissioning graphical representation of brightness are known as FIG. 1 and FIG. 2. In FIG. 1, the horizontal axis is grayscale and the vertical axis is color coordinate value x or color coordinate value y. In FIG. 2, the horizontal axis is grayscale and the vertical axis is gamma value. From the drawings, brightness cannot achieve the desired effect of gamma=2.2 in the initial phase. In order to maintain a steady curve of gamma=2.2 is maintained after about the grayscale twenty raising from the grayscale zero. Also, the chroma requires (x,y) of about the grayscale twenty raising the grayscale to keep consistency with (x,y) of white.

Figure 3:
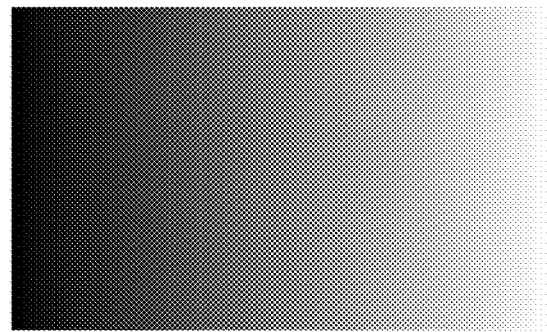
FIG. 3 is a schematic diagram of subjective observe that anomalies of no color and brightness according to grayscale transition smooth and continuous after white balance.

Before computing such as grayscale twenty or gamma rising to 2.2 or (x,y) reaching 255 grayscale color target $(x_0, y_0)$, in the process of low grayscale white balance, a problem is easily generated by the target value is stray too far from the actual value in the prior method. For example, one of the most practical problem is no matter the rising curve is what form, requirement of the grayscale is subjective observe that anomalies of no color and brightness according to grayscale transition smooth and continuous, as shown in FIG. 3.

In prior art, regardless of manual adjustment or automatic adjustment, based on the target brightness, white point is referred as a standard to adjusting. When the white balance of the low grayscale is adjusted in the present disclosure, the low grayscale transition appears unsmoothness when white balance is solved in view of total color difference. Specifically, a tristimulus value of a grayscale zero and a tristimulus value of a grayscale threshold value $n_{max}$ is measured to calculate a total color difference value $\Delta E(n_{max}-0)$ between the grayscale zero and the grayscale threshold value $n_{max}$; a color difference relationship is determined among grayscale from the grayscale zero to the grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth; white balance is controlled according to the color difference relationship between the grayscale zero to the grayscale threshold $n_{max}$. The color difference relationship between the grayscale makes eyes observe that variation from the grayscale zero to the grayscale threshold $n_{max}$ is smooth, and white balance is controlled according to the color difference relationship. Through the method, white balance can be controlled automatically and the low grayscale transitions smoother and natural when eyes is observing subjectivity.

The accompanying drawings and the following embodiments of the present disclosure will be described in detail.

Figure 4:
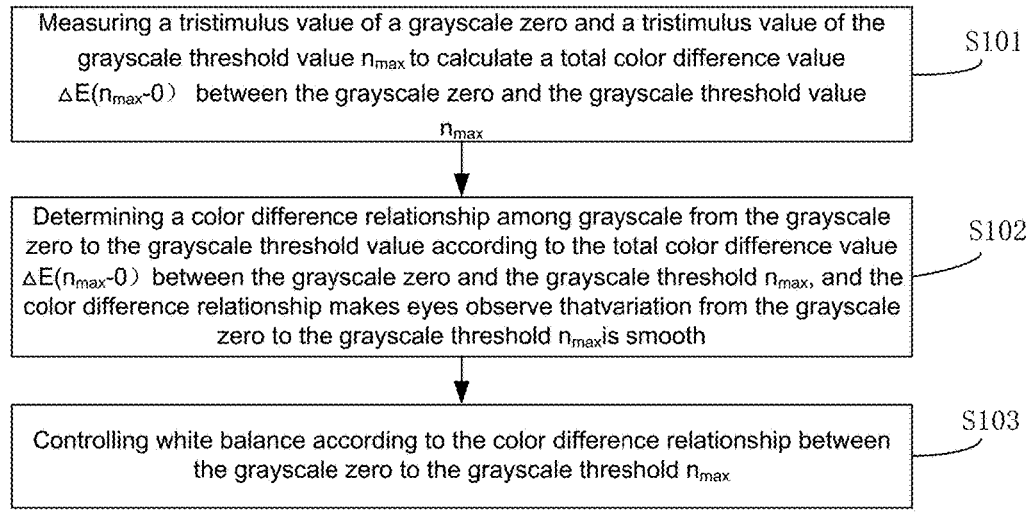
FIG. 4 is a flow chart of a controlling low grayscale white balance method of an embodiment according to the present disclosure.

See FIG. 4. FIG. 4 is a flow chart of a controlling low grayscale white balance method of an embodiment according to the present disclosure. A low grayscale is less than or equal to a grayscale threshold $n_{max}$ value, the method including:

Step S101, measuring a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$.

The grayscale threshold value $n_{max}$ means its color and brightness just to meet the requirement of gamma=2.2 and $(x,y)=(x_0,y_0)$, and the grayscale $n_{max}-1$ still in upward phase of the brightness curve, wherein $(x_0,y_0)$ is a color coordinate referenced by white point.

Wherein the grayscale threshold $n_{max}$ value is 30.

In prior art, tristimulus value measurements are many. For example, weighted-ordinate method, selected-ordinate method, etc.

Color refers to numerical methods represents the difference between the two colors gives the feeling of color.

When the tristimulus value of the grayscale zero and the grayscale threshold value $n_{max}$ are known, the total color difference value $\Delta E(n_{max}-0)$ between the grayscale zero and the grayscale threshold value $n_{max}$ is calculated by the formula of the total color difference. In different system, the specific formula will be slightly different.

For example, the system CIE1976 for example, lightness difference: $\Delta L^* = L^*_2 - L^*_1$, color difference: $\Delta a^* = a^*_2 - a^*_1$, $\Delta b^* = b^*_2 - b^*_1$, total color difference: $\Delta E^*_{ab} = \sqrt{(L^*_2 - L^*_1)^2 + (a^*_2 - a^*_1)^2 + (b^*_2 - b^*_1)^2}$ In addition, the system CIE1994, the system CIE2000, etc. The specific formulas of total color difference are not described in detail.

Step S102, determining a color difference relationship among grayscale from a grayscale zero to a grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth.

The color difference relationship among grayscale is variation of the color difference among grayscale.

In case of the total color difference value $\Delta E(n_{max}-0)$ between the grayscale zero and the grayscale threshold $n_{max}$ is known, when the color difference relationship between the grayscale zero and the grayscale threshold $n_{max}$, can adjust the grayscale zero to the grayscale threshold $n_{max}$, makes eyes observe that variation is smooth, not very much the same, but did not change very suddenly. This color difference relations can be on the basis of the existing experience. For example, the various grayscale arithmetic is gradually increasing, the proportion of arithmetic according to actual situation, such as: grayscale one to twenty respectively is 1, 2, 3, 4, . . . , 20, or: grayscale one to twenty respectively is 1, 3, 5, 7, 9, 11, 13, 15, . . . , 39; or each grayscale is not gradually increasing by the grayscale, but with the rise of the grayscale and linear increase, such as: grayscale one to nine respectively is 1, 2, 4, 7, 11, 15, 21, 28, 36.

Step S103, controlling white balance according to the color difference relationship between the grayscale zero to the grayscale threshold $n_{max}$.

The color difference relationship among grayscale is determined, thus can adjust and control the white balance.

The embodiment measures a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$ according to the present disclosure; determines a color difference relationship among grayscale from a grayscale zero to a grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth; controls white balance according to the color difference relationship between the grayscale zero to the grayscale threshold $n_{max}$. The color difference relationship between the grayscale makes eyes observe that variation from the grayscale zero to the grayscale threshold $n_{max}$ is smooth, and controls white balance according to the color difference relationship. Through the method, white balance can be controlled automatically and the low grayscale transitions smoother and natural when eyes is observing subjectivity.

Wherein, the color difference relationship is $\Delta E$, $\Delta E$ is $\Delta E(n_{max}-0)/(n_{max}-0)$.

In other words, the total color difference between the grayscale zero and the grayscale threshold $n_{max}$ was aliquoted by color difference relationship, for each intermediate grayscale m ($0 < m < n_{max}$), and the color difference of its neighboring grayscale m-1, m+1 are $\Delta E$.

The method is equally spaced arrangement for the color difference of adjacent grayscale, when the light becomes brighter but the details are not necessary, can use the color relationship of this embodiment.

Wherein, the color relationship is $\Delta E(m)$, the $\Delta E(m)$ is $f(\Delta E(n_{max}-0)/(n_{max}-0))$, wherein, the f is a monotonically increasing function which makes the $\Delta E(m)$ increased with the grayscale m, the $\Delta E(m)$ is a color difference relationship between the grayscale m and the grayscale m-1.

System CIE1976 for example, for grayscale m and m-1, there is the following:

$\Delta E(m) = \sqrt{(L^*_m - L^*_{m-1})^2 + (a^*_m - a^*_{m-1})^2 + (b^*_m - b^*_{m-1})^2}$ $\Delta E(m)$ is a monotonically increasing function increased with the grayscale m.

In this way, each color difference of adjacent grayscale are arranged in an irregular pitch. According to the reaction of the human eye, the actual adjacent grayscale $\Delta E(m)$ is larger for higher grayscale, and the grayscale is brighter and the change is greater. When the light becomes brighter and the details are necessary, the color relationship of this embodiment can be used.

Figure 5:
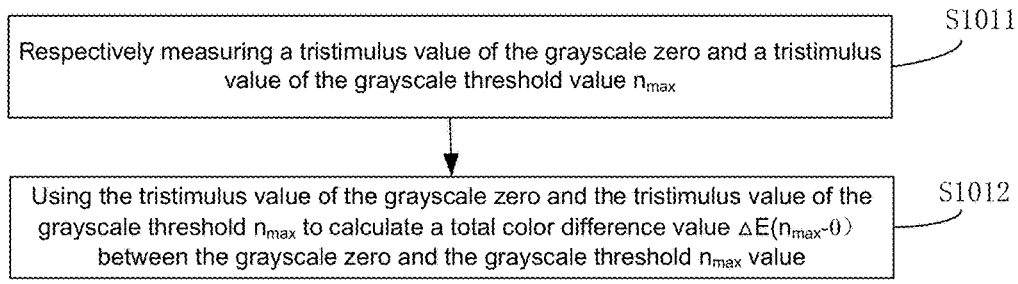
FIG. 5 is a flow chart of a controlling low grayscale white balance method of another embodiment according to the present disclosure.
Figure 6:
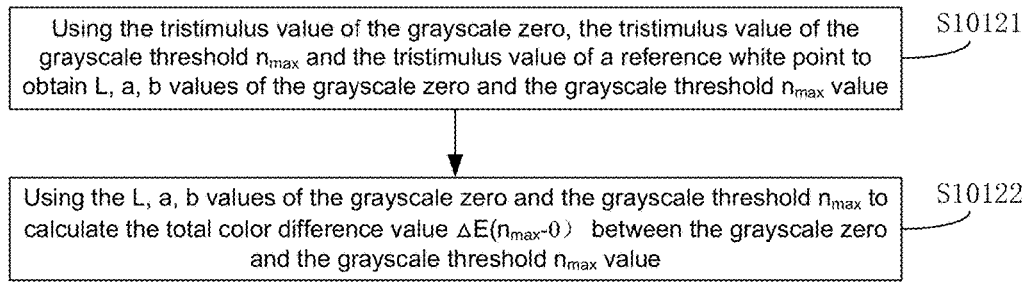
FIG. 6 is a flow chart of a controlling low grayscale white balance method of further embodiment according to the present disclosure.

Wherein, see FIG. 5, step S101 may specifically include: sub-step S1011 and sub-step S1012

Sub-step S1011, respectively measuring a tristimulus value of a grayscale zero and a tristimulus value of a grayscale threshold value $n_{max}$.

Sub-step S1012, using the tristimulus value of the grayscale zero and the tristimulus value of the grayscale threshold $n_{max}$ to calculate a total color difference value $\Delta E(n_{max}-0)$ between the grayscale zero and the grayscale threshold $n_{max}$ value.

In different system CIE Lab, because of the different formula, the specific calculation process is not the same. Following in CIE1976 for example, the calculation process of sub-step S10122 is described.

First, using the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value. Then using the L, a, b values of the grayscale zero and the grayscale threshold $n_{max}$ to calculate the total color difference value $\Delta E(n_{max}-0)$ between the grayscale zero and the grayscale threshold $n_{max}$ value.

$L^* = 116 f(Y/Y_n) - 16$ $a^* = 500[f(X/X_n) - f(Y/Y_n)]$ $b^* = 200[f(Y/Y_n) - f(Z/Z_n)]$

Wherein, $$f(t) = \begin{cases} t^{\frac{1}{3}} & \text{if } t > \left(\frac{6}{29}\right)^3 \\ \frac{1}{3}\left(\frac{29}{6}\right)^2 t + \frac{4}{29} & \text{else} \end{cases}$$

Wherein, $X_n$, $Y_n$, and $Z_n$, are tristimulus values referenced by white point in system CIE XYZ. Under the light source of D65, the value is:

$X_n = 0.95047$, $Y_n = 1.00000$, $Z_n = 1.08883$

Then, according to a chroma space, can obtain $L^*$, $a^*$, $b^*$ from tristimulus values X, Y, Z of a grayscale. Accordingly, $L^*(n_{max})$, $a^*(n_{max})$, $b^*(n_{max})$ of grayscale $n_{max}$ and $L^*(0)$, $a^*(0)$, $b^*(0)$ of grayscale zero are available. According to the formula of total color difference:

$$\Delta E^*_{ab} = \sqrt{(L^*_2 - L^*_1)^2 + (a^*_2 - a^*_1)^2 + (b^*_2 - b^*_1)^2}$$

The total color difference $\Delta E(n_{max}-0)$ is obtained.

Figure 7:
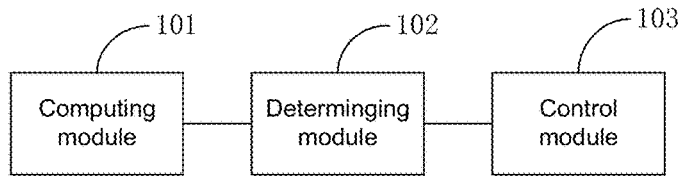
FIG. 7 is a schematic structural view of an embodiment of the present controlling low grayscale white balance apparatus disclosure.

See FIG. 7, FIG. 7 is a schematic structural view of an embodiment of the present controlling low grayscale white balance apparatus disclosure, a low grayscale is less than or equal to a grayscale threshold value $n_{max}$. An apparatus of the present embodiment can perform the above steps in the method, detailed description of the content. Please refer to the above method, and is not described in detail.

The apparatus including: a computing module 101, a determining module 102, a control module 103.

A computing module 101 calculates a total color difference value $\Delta E(n_{max}-0)$ between a grayscale zero and a grayscale threshold value $n_{max}$ by measuring a tristimulus value of the grayscale zero and a tristimulus value of the grayscale threshold $n_{max}$ value.

A determining module 102 determines a color difference relationship among grayscale from the grayscale zero to the grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth.

A control module 103 controls white balance according to the color difference relationship between the grayscale zero to the grayscale threshold $n_{max}$ value.

The embodiment measures a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$ according to the present disclosure; it determines a color difference relationship among grayscale from a grayscale zero to a grayscale threshold value according to the total color difference value $\Delta E(n_{max}-0)$ between the grayscale zero and the grayscale threshold $n_{max}$, and the color difference relationship makes eyes observe that variation from the grayscale zero to the grayscale threshold $n_{max}$ is smooth; it controls white balance according to the color difference relationship between the grayscale zero to the grayscale threshold $n_{max}$. The color difference relationship between the grayscale makes eyes observe that variation from the grayscale zero to the grayscale threshold $n_{max}$ is smooth, and white balance is controlled according to the color difference relationship. Through the method, white balance can be controlled automatically and the low grayscale transitions smoother and natural when eyes is observing subjectivity.

Wherein, the grayscale threshold $n_{max}$ value is 30.

Wherein, the color difference relationship is $\Delta E$, the $\Delta E$ is $\Delta E(n_{max}-0)/(n_{max}-0)$.

Wherein, the color difference relationship is $\Delta E(m)$, the $\Delta E(m)$ is $f(\Delta E(n_{max}-0)/(n_{max}-0))$, wherein, the f is a monotonically increasing function which makes the $\Delta E(m)$ increased with the grayscale m, the $\Delta E(m)$ is a color difference between the grayscale m and the grayscale m-1.

Wherein the computing module 101 includes a measuring unit and a computing unit.

The measuring unit, respectively the tristimulus value of the grayscale zero and the tristimulus value of the grayscale threshold value $n_{max}$ are measured.

The computing unit uses the tristimulus value of the grayscale zero and the tristimulus value of the grayscale threshold $n_{max}$ to calculate a total color difference value $\Delta E(n_{max}-0)$ between the grayscale zero and the grayscale threshold $n_{max}$ value.

Wherein the computing unit includes an obtaining sub-unit and a computing sub-unit.

The obtaining sub-unit uses the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value.

The computing sub-unit uses the L, a, b values of the grayscale zero and the grayscale threshold $n_{max}$ to calculate the total color difference value $\Delta E(n_{max}-0)$ between the grayscale zero and the grayscale threshold $n_{max}$ value.

The above are only embodiments of the present disclosure is not patented and therefore limit the scope of the present disclosure, any use made of the present disclosure specification and brief content equivalent structures or equivalent process transformation, either directly or indirectly related technologies used in other areas are included in the patent empathy scope of the disclosure.

What is claimed is:

1. A method for controlling low grayscale white balance, wherein a low grayscale is less than or equal to a grayscale threshold $n_{max}$ value, the method comprising:

measuring a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$;

determining a color difference relationship among grayscale from the grayscale zero to the grayscale threshold value according to the total color difference value $\Delta E(n_{max}-0)$ between the grayscale zero and the grayscale threshold $n_{max}$;

controlling white balance according to the color difference relationship between the grayscale zero to the grayscale threshold $n_{max}$; and wherein, the color difference relationship is $\Delta E$, the $\Delta E$ is $\Delta E(n_{max}-0)/(n_{max}-0)$; or the color difference relationship is $\Delta E(m)$, the $\Delta E(m)$ is $f(\Delta E(n_{max}-0)/(n_{max}-0))$, wherein, the f is a monotonically increasing function which makes the $\Delta E(m)$ increased with the grayscale m, the $\Delta E(m)$ is a color difference between the grayscale m and the grayscale m-1.

2. The method according to claim 1, wherein the step of measuring a tristimulus value of a grayscale zero and a tristimulus value of the grayscale threshold $n_{max}$ to calculate a total color difference value $\Delta E(n_{max}-0)$ between the grayscale zero and the grayscale threshold value $n_{max}$; comprising the following steps:

respectively measuring the tristimulus value of the grayscale zero and the tristimulus value of the grayscale threshold value $n_{max}$;

using the tristimulus value of the grayscale zero and the tristimulus value of the grayscale threshold $n_{max}$ to calculate a total color difference value $\Delta E(n_{max}-0)$ between the grayscale zero and the grayscale threshold $n_{max}$ value.

3. The method according to claim 2, wherein the step of using the tristimulus value of the grayscale zero and the tristimulus value of the grayscale threshold $n_{max}$ value to calculate the total color difference value $\Delta E(n_{max}-0)$ between the grayscale zero and the grayscale threshold $n_{max}$, comprising the following steps:

using the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value;

using the L, a, b values of the grayscale zero and the grayscale threshold $n_{max}$ to calculate the total color difference value $\Delta E(n_{max}-0)$ between the grayscale zero and the grayscale threshold $n_{max}$ value.

4. The method according to claim 1, wherein the grayscale threshold $n_{max}$ value is 30.

5. A method for control of low grayscale white balance, wherein the low grayscale is less than or equal to a grayscale threshold $n_{max}$ value, the method comprising:

measuring a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$; determining a color difference relationship among grayscale from the grayscale zero to the grayscale threshold value according to the total color difference value $\Delta E(n_{max}-0)$ between the grayscale zero and the grayscale threshold $n_{max}$; and controlling white balance according to the color difference relationship between the grayscale zero to the grayscale threshold $n_{max}$.

6. The method according to claim 5, wherein the color difference relationship is $\Delta E$, the $\Delta E$ is $\Delta E(n_{max}-0)/(n_{max}-0)$.

7. The method according to claim 5, wherein the color difference relationship is $\Delta E(m)$, the $\Delta E(m)$ is $f(\Delta E(n_{max}-0)/(n_{max}-0))$, wherein, the f is a monotonically increasing function which makes the $\Delta E(m)$ increased by the grayscale m, the $\Delta E(m)$ is a color difference relationship between the grayscale m and the grayscale m−1.

8. The method according to claim 5, wherein the step of measuring a tristimulus value of a grayscale zero and a tristimulus value of the grayscale threshold value $n_{max}$ to calculate a total color difference value $\Delta E(n_{max}-0)$ between the grayscale zero and the grayscale threshold value $n_{max}$; comprising the following steps:

respectively measuring the tristimulus value of the grayscale zero and the tristimulus value of the grayscale threshold value $n_{max}$;

using the tristimulus value of the grayscale zero and the tristimulus value of the grayscale threshold $n_{max}$ to calculate a total color difference value $\Delta E(n_{max}-0)$ between the grayscale zero and the grayscale threshold $n_{max}$ value.

9. The method according to claim 8, wherein the step of using the tristimulus value of the grayscale zero and the tristimulus value of the grayscale threshold $n_{max}$ value to calculate the total color difference value $\Delta E(n_{max}-0)$ between the grayscale zero and the grayscale threshold $n_{max}$, comprising the following steps:

Using the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value;

using the L, a, b values of the grayscale zero and the grayscale threshold $n_{max}$ to calculate the total color difference value $\Delta E(n_{max}-0)$ between the grayscale zero and the grayscale threshold $n_{max}$ value.

10. The method according to claims 5-9, wherein the grayscale threshold $n_{max}$ value is 30.

11. An apparatus for controlling of low grayscale white balance, wherein the low grayscale is less than or equal to a grayscale threshold value $n_{max}$, the apparatus comprising:

a computing module, calculating a total color difference value $\Delta E(n_{max}-0)$ between a grayscale zero and a grayscale threshold value $n_{max}$ by measuring a tristimulus value of the grayscale zero and a tristimulus value of the grayscale threshold $n_{max}$ value;

a determining module, determining a color difference relationship among grayscale from the grayscale zero to the grayscale threshold value according to the total color difference value $\Delta E(n_{max}-0)$ between the grayscale zero and the grayscale threshold $n_{max}$; and a controller, controlling white balance according to the color difference relationship between the grayscale zero to the grayscale threshold $n_{max}$ value.

12. The apparatus according to claim 11, wherein the color difference relationship is $\Delta E$, the $\Delta E$ is $\Delta E(n_{max}-0)/(n_{max}-0)$.

13. The apparatus according to claim 11, wherein the color relationship is $\Delta E(m)$, the $\Delta E(m)$ is $f(\Delta E(n_{max}-0)/(n_{max}-0))$, wherein, the f is a monotonically increasing function which makes the $\Delta E(m)$ increased with the grayscale m, the $\Delta E(m)$ is a color difference relationship between the grayscale m and the grayscale m−1.

14. The apparatus according to claim 11, wherein the computing module comprising:

a measuring unit, respectively measuring the tristimulus value of the grayscale zero and the tristimulus value of the grayscale threshold value $n_{max}$;

a computing unit using the tristimulus value of the grayscale zero and the tristimulus value of the grayscale threshold $n_{max}$ to calculate a total color difference value $\Delta E(n_{max}-0)$ between the grayscale zero and the grayscale threshold $n_{max}$ value.

15. The apparatus according to claim 14, wherein the computing unit comprising:

a receiver, using the tristimulus value of the grayscale zero, the tristimulus value of the grayscale threshold $n_{max}$ and the tristimulus value of a reference white point to obtain L, a, b values of the grayscale zero and the grayscale threshold $n_{max}$ value;

a computing sub-unit, using the L, a, b values of the grayscale zero and the grayscale threshold $n_{max}$ to calculate the total color difference value $\Delta E(n_{max}-0)$ between the grayscale zero and the grayscale threshold $n_{max}$ value.

16. The apparatus according to claims 11-15, wherein the grayscale threshold $n_{max}$ value is 30.

* * * * *